(12) United States Patent
Großmann et al.

(10) Patent No.: US 12,498,327 B2
(45) Date of Patent: Dec. 16, 2025

(54) SYSTEM FOR ANALYZING A SAMPLE

(71) Applicant: Analytik Jena GmbH+Co. KG, Jena (DE)

(72) Inventors: Marcus Großmann, Jena (DE); Iouri Kalinitchenko, Jena-Maua (DE); Wolfram Weisheit, Saara (DE); Philipp Frederic Schulz, Drei Gleichen (DE)

(73) Assignee: Analytik Jena GmbH+Co. KG, Jena (DE)

( * ) Notice: Subject to any disclaimer, the term of this patent is extended or adjusted under 35 U.S.C. 154(b) by 191 days.

(21) Appl. No.: 18/480,681

(22) Filed: Oct. 4, 2023

(65) Prior Publication Data
US 2024/0118212 A1  Apr. 11, 2024

(30) Foreign Application Priority Data

Oct. 7, 2022 (DE) ............... 10 2022 126 023.2
Oct. 10, 2022 (DE) ............... 10 2022 126 192.1

(51) Int. Cl.
G01N 21/71 (2006.01)
G01N 21/73 (2006.01)
H01J 49/10 (2006.01)

(52) U.S. Cl.
CPC ........... G01N 21/718 (2013.01); G01N 21/73 (2013.01); H01J 49/105 (2013.01)

(58) Field of Classification Search
CPC ...... G01N 21/718; G01N 21/73; H01J 49/105
See application file for complete search history.

(56) References Cited

U.S. PATENT DOCUMENTS

| 5,715,053 A | 2/1998 | Loge |
| 11,247,295 B1 | 2/2022 | Bol'Shakov et al. |
| 2014/0070085 A1 | 3/2014 | Molloy et al. |
| 2021/0341392 A1* | 11/2021 | Bol'shakov ......... H01J 49/0463 |

* cited by examiner

*Primary Examiner* — Jamil Ahmed
(74) *Attorney, Agent, or Firm* — Christopher R. Powers; Endress+Hauser (USA) Holding, Inc.

(57) ABSTRACT

A method for analyzing a sample using a system, wherein the sample is a solid sample comprising a first chemical element and a second chemical element, wherein the system comprises a plasma spectrometer and an analytical device, the method including: determining a concentration of the first chemical element using the analytical device; determining a sensitivity of the plasma spectrometer to the first chemical element and to the second chemical element; measuring a signal intensity of the first chemical element using the plasma spectrometer; measuring a signal intensity of the second chemical element using the plasma spectrometer; and calculating a concentration of the second chemical element using the determined concentration of the first chemical element, the sensitivities to the first chemical element and to the second chemical element, and the signal intensities of the first chemical element and the second chemical element.

18 Claims, 3 Drawing Sheets

Fig. 3
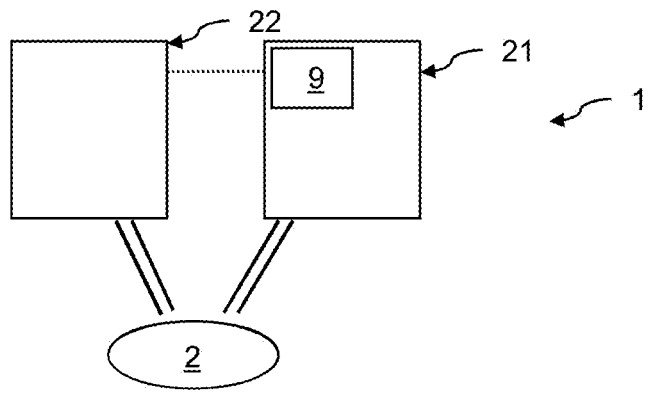
Fig. 4
| Sample: analyzed chemical element | concentration by XRF [ppm] | Signal intensity [counts/s] | Sensitivity [counts/s·ppm] | concentration by plasma spectrometer [ppm] |
|---|---|---|---|---|
| NIST 610: 12% Ca | 120,000 | 2.0E+09 | 1.67E+04 | 120,000 |
| NIST 610: 25 ppm Au | (25 ± 2) | 1.21E+06 | 4.84E+04 | (24.89 ± 0.11) |
| NIST 612: 5 ppm Au | (5 ± 3) | 2.45E+05 | | (5.03 ± 0.03) |
| NIST 616: 0.18 ppm Au | - | 8.60E+03 | | (0.180 ± 0.001) |
Fig. 5
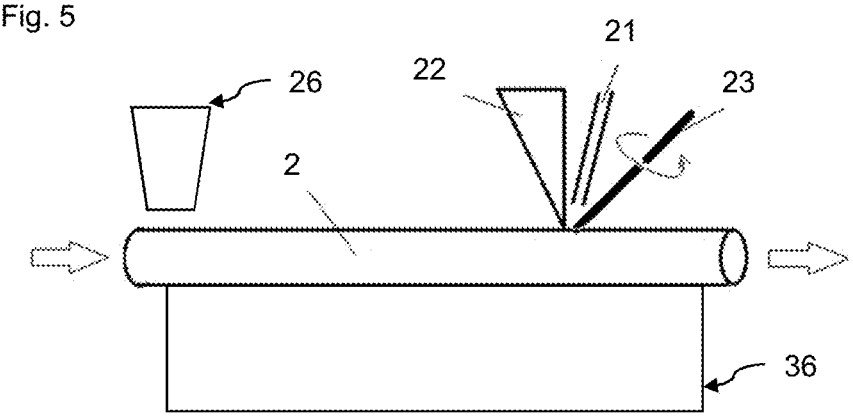

SYSTEM FOR ANALYZING A SAMPLE

CROSS-REFERENCE TO RELATED APPLICATION

The present application is related to and claims the priority benefit of German Patent Application No. 10 2022 126 023.2, filed Oct. 7, 2022, and German Patent Application No. 10 2022 126 192.1, filed Oct. 10, 2022, the entire contents of which are incorporated herein by reference.

TECHNICAL FIELD

The present disclosure relates to systems and methods for analyzing a sample comprising a plasma spectrometer and an analytical device and to methods to calibrate such systems.

BACKGROUND

Plasma spectrometers utilize a plasma for ionizing a sample and generating ions and/or photons from the sample. The ions are typically analyzed by means of a mass spectrometer, whereas the photons are usually analyzed by means of optical spectrometers.

In a mass spectrometer, the molecules or atoms of a sample are first transferred into the gas phase and ionized. For ionization, various methods known from the state of the art are available, such as inductively coupled plasma ionization (ICP) which ionizes the sample by means of a plasma. Up to now, several different types of inductively coupled plasma mass spectrometers (ICP-MS) are available, as e.g., the quadrupole ICP-MS or time-of-flight ICP-MS.

After ionization, the ions pass through a vacuum interface to a mass analyzer, in which they are separated according to their mass-to-charge ratio (m/z). Different types of interfaces and modes of operation are based, for example, on the application of static or dynamic electric and/or magnetic fields or on different times of flight of different ions. In particular, different types of interfaces include single, multiple or hybrid arrangements of analyzers, such as quadrupole, triple-quadrupole, time-of-flight (TOF), ion trap, Orbitrap or magnetic sector. Finally, the separated ions are guided towards a detector which, e.g., is one of a photo-ion multiplier, ion-electron multiplier, Faraday collector, Daly detector, microchannel plate or a channeltron.

The ions generated during the ionization of a sample by means of inductively coupled plasma ionization (ICP) can be analyzed with optical spectrometers, e.g., inductively coupled plasma optical emission spectrometer (ICP-OES).

The inductively coupled plasma is often sustained with Argon gas. Recently, an alternative ionization method has been described which uses Nitrogen gas for sustaining the plasma, the so called MICAP (microwave inductively coupled atmospheric plasma) which can be applied for mass spectrometry as well as for optical spectrometry (see U.S. Pat. No. 9,706,635 B2). MICAP generates a plasma which is also sustainable with air. As described in unpublished U.S. application Ser. No. 18/466,925, the nitrogen-sustained plasma can even be used to aspirate the sample into the mass spectrometer and towards the plasma.

However, both mass spectrometers and optical spectrometers need to be calibrated with the help of a standard or reference material which contains a known concentration of a chemical element. Whereas calibration is well-established for liquid samples, calibration of solid samples remains a problem. Due to small sample inconsistencies during entering of the sample into the plasma, e.g., due to differences in particle sizes or densities within the sample, the signal intensity obtained at the detector of the plasma spectrometer is not stationary but fluctuates.

SUMMARY

Therefore, it is an object of the present disclosure to provide a method and a system with which calibration of a plasma spectrometer is possible in an easy manner.

The object is achieved by a method for analyzing a sample by means of a system, wherein the sample is a solid sample and comprises a first chemical element and a second chemical element, wherein the system comprises a plasma spectrometer and an analytical device, wherein the plasma spectrometer is configured to ionize the sample by means of a plasma such that ions and/or photons are generated and to analyze the generated ions and/or photons, wherein the analytical device is configured to determine a concentration of the first chemical element, wherein the sample is provided to the plasma spectrometer in the form of an aerosol, wherein the method comprises at least the following steps:
determining the concentration of the first chemical element by means of the analytical device;
determining a sensitivity of the plasma spectrometer to the first chemical element and to the second chemical element;
measuring the signal intensity of the first chemical element by means of the plasma spectrometer;
measuring a signal intensity of the second chemical element by means of the plasma spectrometer; and
calculating the concentration of the second chemical element by means of the determined concentration of the first chemical element, the sensitivities to the first chemical element and to the second chemical element and the signal intensities of the first chemical element and the second chemical element.

According to the present disclosure, the concentration of the first chemical element determined by means of the analytical device is used to calibrate the signal intensities of the plasma spectrometer. Although the signal intensities of the solid sample will fluctuate, all signal intensities will fluctuate in the same order. Consequently, the signal intensities are calibrated by assigning the determined concentration to one of the signal intensities, i.e., the first chemical element. The concentration of the second chemical element (and of further chemical elements) is then calculated.

Generally, each chemical element is detected by the plasma spectrometer with its respective sensitivity, which needs to be considered during the calculation of the concentration of the second chemical element. For example, the respective sensitivities of the first chemical element and the second chemical element are determined during an initial setup of the plasma spectrometer, e.g., using reference standards with known concentrations of the first and second chemical element.

There are different ways to calculate the concentration of the second chemical element. One way is to determine the ratio of the signal intensities of the first chemical element and the second chemical element, to determine the ratio of the sensitivities to the first chemical element and to the second chemical element, to multiply the determined concentration of the first chemical element with the ratio of the sensitivities, and by dividing the result by the determined ratio of the signal intensities.

Another way is to determine the ratio of the signal intensities of the first chemical element and the second chemical element, to determine the ratio of the sensitivities to the first chemical element and to the second chemical element, to divide the determined concentration of the first chemical element by the signal intensity of the first chemical element, and then to multiply the result with the signal intensity of the second chemical element and with the ratio of the sensitivities to obtain the concentration of the second chemical element.

Other ways to calculate the concentration of the second chemical element also fall within the scope of the present disclosure.

Typically, the plasma spectrometer is configured to determine the concentration of (at least) the second element with much higher precision than the analytical device. Determining the concentration of the second chemical element is therefore preferred by means of the plasma spectrometer.

There are many methods to produce an aerosol from a solid sample which all fall under the scope of the present disclosure.

In one embodiment, the sample is a powder or dust or a rock sample or a soil sample or a drug or a food sample.

In another embodiment, a surface of the sample is mechanically machined such that the sample is partially brought into the form of an aerosol. The surface of the sample can be machined such that dust or powder is created from the surface, e.g., by drilling or scratching or grinding. The dust or powder may form an aerosol together with the surrounding atmosphere, e.g., air.

Further, the sample may be provided in the form of a solid cylinder. The solid cylinder may be obtained by surface drilling. For example, to find metals or other precious elements in the ground, especially underground, long cylinders, up to 1 km of length and longer, are drilled into the ground. The cylindrical sample is brought up to the surface and analyzed with regard to its chemical elements.

In another embodiment, the sample is brought into the form of an aerosol by means of exposure to mechanical machining, light, electric power and/or sound waves. The sample can be exposed to strong light or laser pulses such that dust or powder is created from the surface of the sample. Similarly, the sample can also be exposed to focused ultrasound waves such that dust or powder is created from the surface of the sample. Again, the aerosol may be formed in air and provided as such to the plasma spectrometer.

The object of the present disclosure is further achieved by a system for analyzing a sample comprising a plasma spectrometer and an analytical device, wherein the sample is a solid sample and comprises a first chemical element and a second chemical element, wherein the plasma spectrometer is configured to ionize the sample by means of a plasma such that ions and/or photons are generated and to analyze the generated ions and/or photons, wherein the analytical device is configured to determine a concentration of the first chemical element, wherein the sample is provided to the plasma spectrometer in the form of an aerosol, wherein the system is configured to execute the method according to the present disclosure.

According to the present disclosure, an easy calibration of the plasma spectrometer with respect to solid samples is possible, which enables a quick and straightforward sample analysis. In one embodiment, the plasma spectrometer and the analytical device are arranged such that a same area or portion of the sample is analyzed by either device. The concentrations of the first chemical element and/or the second chemical element may differ throughout the sample, e.g., in a case of a large sample. Therefore, it can be necessary to analyze the same area or portion of the sample with both the plasma spectrometer and the analytical device.

In another embodiment, the system comprises a sample unit which is configured to move the sample along a direction, wherein the analytical device and the plasma spectrometer are arranged along the direction such that the same area or portion of the sample is continuously analyzed by either device. In such an embodiment, continuous analysis of the sample is enabled.

Further, the system may comprise a cleaning unit which is configured to clean and/or dry the sample prior to providing the sample to the analytical device and/or the plasma spectrometer. The sample may be wet and/or contain dirt or other material on its surface which needs to be removed prior to analyzing the sample by means of the plasma spectrometer and/or the analytical device.

Another embodiment comprises that the analytical device is configured to determine the concentration of the first chemical element with a high precision, e.g., with a precision of less than 3% relative standard deviation. To ensure a precise calibration of the plasma spectrometer by means of the analytical device, the analytical device is ideally able to determine the first chemical element with a high precision.

It is further advantageous that the plasma spectrometer is configured to determine the concentration of the second element in a concentration range which is not available or only partially available by means of the analytical device. Often, the analytical device is not able to determine the concentration of the second element at all or only with a rather low precision. By determining the concentration of the second chemical element by means of the plasma spectrometer, a much higher precision may be obtained or may be measured at all.

In at least one embodiment, the plasma spectrometer is configured to aspirate the sample in the form of an aerosol, e.g., by means of the plasma. The plasma spectrometer may comprise a plasma torch configured to produce a plasma. The plasma may be configured to aspirate the sample into the plasma.

In one embodiment, the plasma spectrometer is a microwave inductively coupled atmospheric plasma mass spectrometer, a microwave inductively coupled atmospheric plasma optical emission spectrometer, a radio-frequency inductively coupled mass spectrometer, a radio-frequency inductively coupled optical spectrometer, a glow discharge mass spectrometer, or a glow discharge optical spectrometer.

In another embodiment, the analytical device is an X-ray fluorescence spectrometer, a laser induced breakdown spectrometer or an X-ray diffractometer.

BRIEF DESCRIPTION OF THE DRAWINGS

In the following, the present disclosure as well as exemplary embodiments will be described based on the figures, wherein:

FIG. 3 shows an embodiment of the system according to the present disclosure;

FIG. 4 shows a table in which the calculation and results of the method according to the present disclosure are shown;

FIG. 5 shows a further embodiment of the system according to the present disclosure.

In the figures, same elements are provided with the same reference numbers.

DETAILED DESCRIPTION

Figure 1:
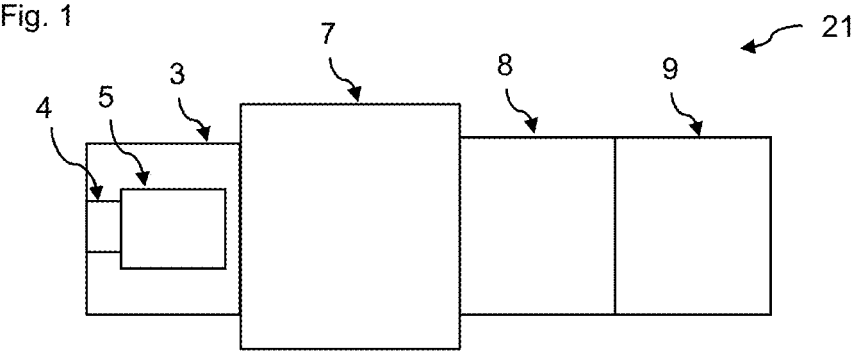
FIG. 1 shows a general schematic of a plasma spectrometer.

FIG. 1 schematically illustrates a schematic plasma spectrometer 21, which may be used with the present disclosure. The plasma spectrometer 21 may comprise a sample preparation unit 3 with a sample inlet 4 and a plasma torch 5, an interface 7, a detector 8, and an evaluation unit 9. The sample inlet 4 may be arranged upstream of the plasma torch 5, as shown in FIG. 1. The components of the plasma spectrometer 21 may also be arranged differently.

The plasma spectrometer 21 may be configured to allow introduction of the sample 2 into the plasma 6 along a downwards-pointing vertical direction and/or to allow ions to be extracted from the plasma 6 along the downwards-pointing vertical direction. The downwards-pointing vertical direction points in the same direction as gravity. The plasma torch 5 may comprise a vertically oriented injector tube configured to introduce the sample 2 into the plasma 6. The plasma torch 5 may be arranged vertically. In such an embodiment, a carrier gas which is used to introduce the sample 2 into the plasma torch 5 has a lesser impact on sample introduction. It is even possible to omit the carrier gas such that the sample 2 is introduced into the plasma 6 by gravity alone. Obviously, other arrangements of the plasma torch 5 also fall under the scope of the present disclosure.

The evaluation unit 9 can also be arranged apart from the other components. The plasma spectrometer 21 or some of its components may be housed in a housing (not shown). In embodiments in which the plasma spectrometer 21 is embodied as a mass spectrometer, the interface 7 may be a mass-analyzer, and the detector 8 may be an ion-electron multiplier, a Faraday collector, a Daly detector, a microchannel plate or a channeltron or other suitable, equivalent detector. In embodiments in which the plasma spectrometer 21 is embodied as an optical spectrometer, the interface 7 may be a wavelength-selector and the detector 8 a photomultiplier tube or a CCD camera other suitable, equivalent detector.

Figure 2:
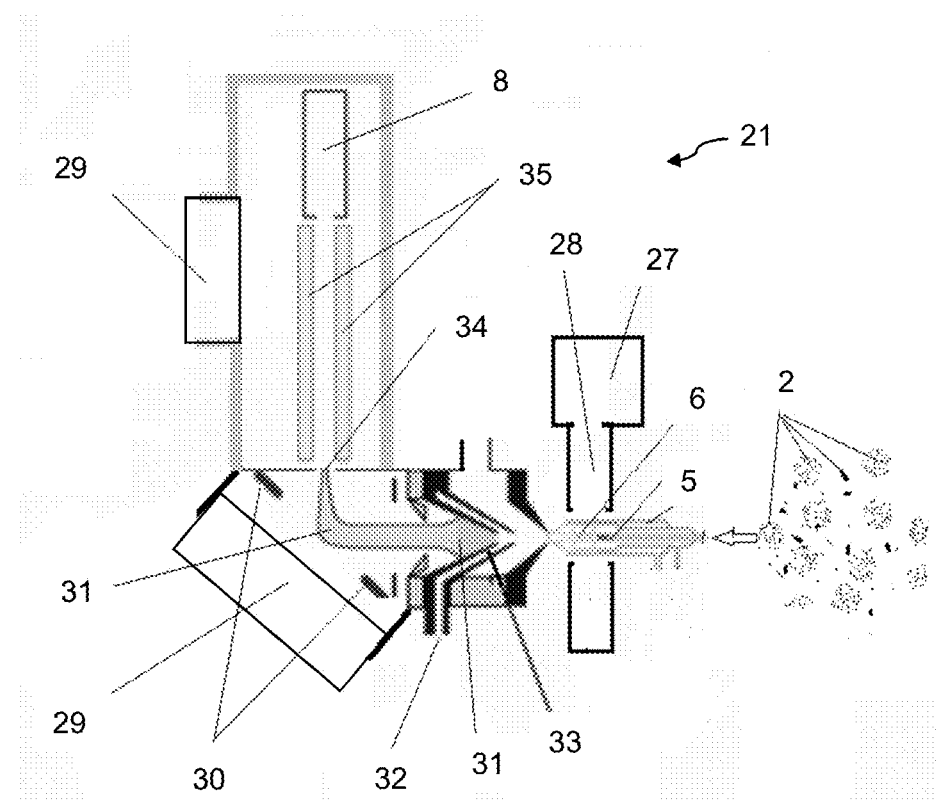
FIG. 2 shows an embodiment of a plasma spectrometer according to the present disclosure.

FIG. 2 illustrates an exemplary embodiment of plasma spectrometer 21 of the present disclosure as a microwave inductively coupled atmospheric plasma mass spectrometer (MICAP-MS). The sample 2 may be aspirated by means of the plasma 6 through the sample inlet 4 into the mass spectrometer 21. The plasma 6 is generated by means of a MICAP source 27 in combination with a waveguide 28 specialized for MICAP. Upon entering the plasma torch 5, the sample 2 is ionized by the plasma 6 such that ions and/or photons are generated. To detect the generated ions with the detector 8, the ions 31 are guided by means of an ion optics 30 and mass analyzer 35 towards the detector 8.

After the plasma 6, a skimmer cone 33 is arranged to skim and focus the ions into an ion beam 31. A collisional/reaction gas 32 may be introduced into the ion beam 31 to remove interfering ions through ion/neutral reactions. The ion beam 31 is then directed and focused by means of ion mirrors 30 towards the mass analyzer 35 in which the ions are separated according to their mass-to-charge ratio (m/z). The ions are then detected by the detector 8. Pumps 29 can be arranged to generate vacuum conditions after the plasma torch 5.

FIG. 3 illustrates an embodiment of the system 1 according to the present disclosure, comprising a plasma spectrometer 21 and an analytical device 22. The plasma spectrometer 21 is configured to ionize the sample 2 by means of a plasma 6 such that ions and/or photons are generated and to analyze the generated ions and/or photons. The analytical device 22 is configured to determine a concentration of the first chemical element. The sample 2 is a solid sample, e.g., a powder or dust or a rock sample or a soil sample or a drug or a food sample, and is provided to the plasma spectrometer 21 in the form of an aerosol. There are many ways to produce an aerosol from a solid sample, including mechanical, electrical, photonic or acoustic methods. Often, particles or dust or powder is created from the sample which then forms an aerosol together with the surrounding gas, e.g., air.

To perform the method according to the present disclosure, the plasma spectrometer 21 and the analytical device 22 may be connected via a cable (illustrated as a dotted line in FIG. 3) such that the concentration of the first chemical element is sent from the analytical device 22 to the plasma spectrometer 21, e.g., to the evaluating unit 9 of the plasma spectrometer 21. The plasma spectrometer 21 may be a microwave inductively coupled atmospheric plasma mass spectrometer, a microwave inductively coupled atmospheric plasma optical emission spectrometer, a radio-frequency inductively coupled mass spectrometer, a radio-frequency inductively coupled optical spectrometer, a glow discharge mass spectrometer, or a glow discharge optical spectrometer or other suitable, equivalent spectrometer. The analytical device 22 may be an X-ray fluorescence (XRF) spectrometer, a laser induced breakdown spectrometer or X-ray diffractometer.

XRF spectrometers are typically used to determine the concentration of gold or other (precious) chemical elements in soil samples because XRF spectrometers are simple to use and can be used on-site, i.e., where the sample has been found or drilled, etc. Samples with high enough gold concentrations are then sent to a laboratory in which the gold concentration is determined more precisely by means of plasma spectrometers. Mining companies are nowadays interested in gold concentrations down to 1 ppm. However, XRF spectrometers cannot measure the gold concentration under 10 ppm with high precision. Clearly, there is a lack of on-site accessibility of the gold concentration of the soil samples.

In the present disclosure, the system 1 provides the gold concentration (or the concentration of other precious metals or chemical elements) on-site with high precision, even down to very low gold concentrations, e.g., down to 1.2 ppb. Whereas XRF may not be used to measure the gold concentration at all or only at low precision, it is able to measure other chemical elements with high precision which may be abundant in the sample 2. For example, the XRF spectrometer may be used to determine the concentration of aluminum or silicon (e.g., as the first chemical element) in the sample 2. The concentration of aluminum or silicon determined by XRF can be used to calibrate the plasma spectrometer 21. The gold concentration in the sample 2 can then be determined with high precision. A further example is provided in FIG. 4.

FIG. 4 shows a table with experimental results from the system according to the present disclosure. Three reference standards from NIST were used for testing the system, each containing 12% calcium and different concentrations of gold. In the first column, the respective reference standard and the concentration of the chemical element to be analyzed is given. The second column gives the concentration as determined by XRF. For the gold concentrations, the respective error has been added. Whereas the error from XRF in the reference standard containing 25 ppm gold is somewhat low with ca. 8%, the error in the reference standard containing 5 ppm gold is as high as 60%. XRF was not able to detect any gold in the last reference standard containing 0.18 ppm gold. The third column gives the signal intensities for the respective chemical element of the respective reference standard as obtained by a plasma mass spectrometer, such as shown in FIG. 2. The fourth column gives the sensitivity of the plasma spectrometer to calcium and gold. The calculated concentration of the second chemical element, e.g., gold, is shown in the last column.

The ratio of the signal intensities of calcium (the first chemical element) and gold (the second chemical element) of the NIST 610 sample is about 1,653. The ratio of the sensitivities to the first chemical element and to the second chemical element is about 0.345. The concentration of the second chemical element can be obtained by multiplying the determined concentration of the first chemical element with the ratio of the sensitivities and by dividing the result by the determined ratio of the signal intensities. In another way, the concentration of the second chemical element can be obtained by dividing the determined concentration of the first chemical element by the signal intensity of the first chemical element and then to multiply the result with the signal intensity of the second chemical element and with the ratio of the sensitivities. After calibration of the plasma spectrometer with the concentration of the first chemical element, the concentration of gold can be determined with high precision, even in the reference standard containing only 0.18 ppm gold.

FIG. 5 shows another embodiment of the system 1 in which the sample 2 is provided as a solid cylinder. The solid cylinder may be obtained by surface drilling. The plasma spectrometer 21 and the analytical device 22 may be arranged such that a same area or portion of the sample 2 is analyzed by either device 21, 22. Using a drilling unit 23 the surface of the sample may be machined such that an aerosol is formed (in air), which is provided to the plasma spectrometer 21. The analytical device 22 may be configured to determine the concentration of the first chemical element based on the solid sample or the aerosol. The system 1 may further comprise a sample unit 36, which is configured to move the sample 2 along a direction such that the plasma spectrometer 21 and the analytical device 22 can analyze the sample 2 continuously. Furthermore, the system 1 may comprise a cleaning unit 26 configured to clean and/or dry the sample 2 prior to providing the sample 2 to the analytical device 22 and/or the plasma spectrometer 21.

Figure 6:
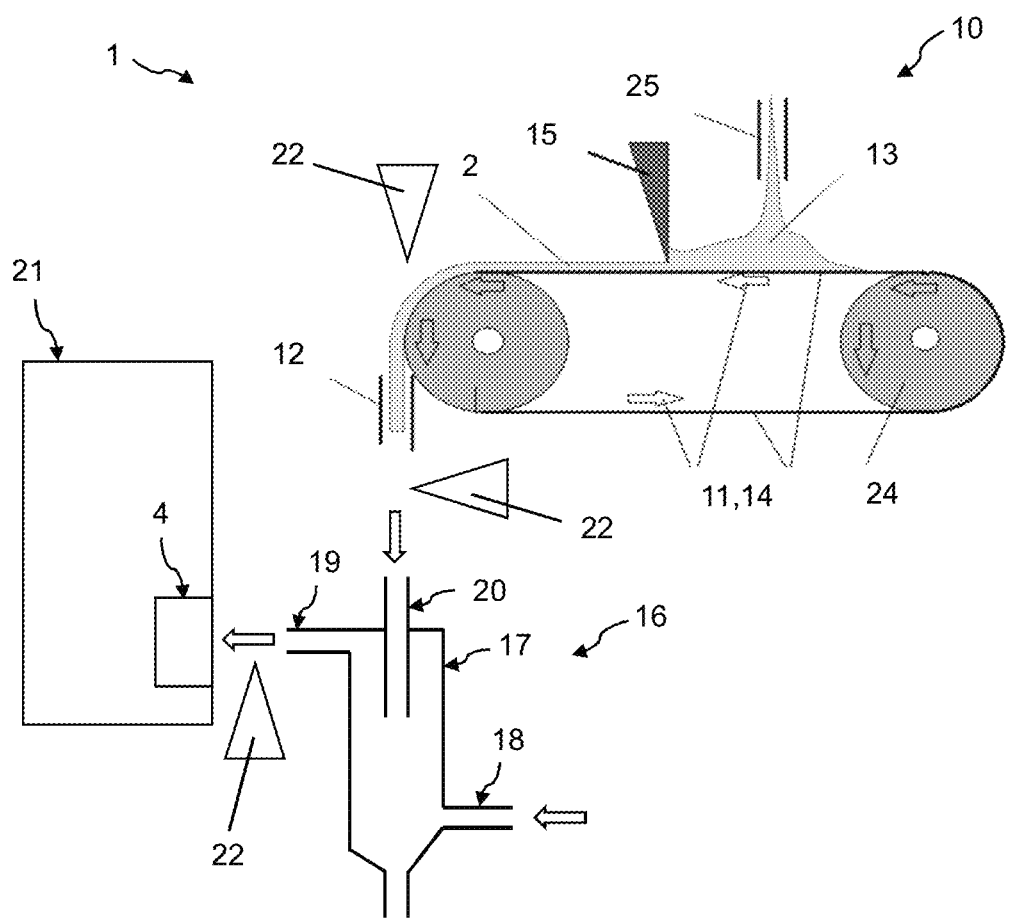
FIG. 6 shows another embodiment of the system according to the present disclosure.

The plasma spectrometer 21 may further comprise additional components such as a sample introduction unit 10 and/or a classifier 16, which are illustrated in FIG. 6.

The sample introduction unit 10 may be configured to introduce the sample 2 into the sample inlet 4 of the plasma spectrometer 21. The sample introduction unit 10 may comprise a transport means 11, e.g., a moving belt 14, which is configured to transport the sample 2 towards the sample inlet 4, and a connecting unit 12, which is configured to be connectable with the sample inlet 4. The sample introduction unit 10, as shown in FIG. 6, further comprises a transfer tube 25 through which particles 13, e.g., dust or powder, are guided towards the moving belt 14, which is being loaded with the particles 13 and moves the particles 13 towards the sample inlet 4 by means of the rollers 24. A dosage controller 15 is arranged and configured to control the amount of particles 13 entering the sample inlet 4 through the connecting unit 12. The sample inlet 4 or the sample introduction unit 10 can be open to the ambient atmosphere to aspirate air together with the particles thus forming the sample 2. The sample introduction unit 10 may be connected directly with the sample inlet 4 (not shown).

The plasma spectrometer 21 may further comprise a classifier 16 as shown in FIG. 6 which is configured to separate smaller particles from larger particles within the sample 2 and to guide particles with a mass below a predefined upper mass limit to the sample inlet 4. The classifier 16 may comprise a container 17 with an inlet 18, which is connected to air or gas, and an outlet 19, which is connectable to the sample inlet 4. Moreover, a tube 20 may be inserted partially into the container 17 such that the flow of the sample 2 is opposed to the flow of the particles with a mass below the predefined upper mass limit towards the outlet 19. Particles with a mass above the predefined upper mass limit will sediment towards the lower end of the container 17. The suction property of the plasma 6 can be used to aspirate the particles 13 together with air as the sample 2 into the plasma spectrometer 1. In at least one embodiment, the classifier 16 is arranged between the sample introduction unit 10 and the sample inlet 4.

The position of the analytical device 22 may vary. For example, it can be arranged next to the transport means 11 or next to the connecting unit 12 or between the classifier 16 and the sample inlet 4.

The invention claimed is:

1. A method for analyzing a sample using a system, wherein the sample is a solid sample comprising a first chemical element and a second chemical element, wherein the system comprises a plasma spectrometer and an analytical device, wherein the plasma spectrometer is configured to ionize the sample using a plasma, such that ions and/or photons are generated, and to analyze the generated ions and/or photons, wherein the analytical device is configured to determine a concentration of the first chemical element, wherein the sample is provided to the plasma spectrometer in the form of an aerosol, the method comprising:
   determining a concentration of the first chemical element using the analytical device;
   determining a sensitivity of the plasma spectrometer to the first chemical element and a sensitivity of the plasma spectrometer to the second chemical element;
   measuring a signal intensity of the first chemical element using the plasma spectrometer;
   measuring a signal intensity of the second chemical element using the plasma spectrometer; and
   calculating a concentration of the second chemical element based on the determined concentration of the first chemical element, the sensitivities of the plasma spectrometer to the first chemical element and to the second chemical element, and the signal intensities of the first chemical element and the second chemical element.

2. A method according to claim 1, wherein the sample is at least one of a powder or dust, a rock sample, a soil sample, a drug sample, and a food sample.

3. A method according to claim 1, wherein a surface of the sample is mechanically machined such that the sample is partially brought into the form of an aerosol.

4. A method according to claim 1, wherein the sample is provided in the form of a solid cylinder.

5. A method according to claim 4, wherein the solid cylinder is obtained by surface drilling.

6. A method according to claim 1, wherein the sample is brought into the form of an aerosol by exposure to mechanical machining, light, electric power and/or sound waves.

7. A system for analyzing a sample, the system comprising:
   a plasma spectrometer; and
   an analytical device, wherein the sample is a solid sample comprising a first chemical element and a second chemical element, wherein the plasma spectrometer is configured to ionize the sample using a plasma, such that ions and/or photons are generated, and to analyze the generated ions and/or photons, wherein the analytical device is configured to determine a concentration of the first chemical element, wherein the sample is provided to the plasma spectrometer in the form of an aerosol, and wherein the system is configured to execute the method according to claim 1.

8. The system according to claim 7, wherein the plasma spectrometer and the analytical device are arranged such that a same area or portion of the sample is analyzed by either device.

9. The system according to claim 7, further comprising a sample unit configured to move the sample along a direction, and
wherein the analytical device and the plasma spectrometer are arranged along the direction such that the same area or portion of the sample is continuously analyzed by either device.

10. The system according to claim 7, further comprising a cleaning unit configured to clean and/or dry the sample prior to providing the sample to the analytical device and/or the plasma spectrometer.

11. The system according to claim 7, wherein the analytical device is configured to determine the concentration of the first chemical element with a high precision of less than 3% relative standard deviation.

12. The system according to claim 7, wherein the plasma spectrometer is configured to determine the concentration of the second element in a concentration range which is not available or only partially available via the analytical device.

13. The system according to claim 7, wherein the plasma spectrometer is configured to aspirate the sample in the form of an aerosol using the plasma.

14. The system according to claim 7, wherein the plasma spectrometer is a microwave inductively coupled atmospheric plasma mass spectrometer, a microwave inductively coupled atmospheric plasma optical emission spectrometer, a radio-frequency inductively coupled mass spectrometer, a radio-frequency inductively coupled optical spectrometer, a glow discharge mass spectrometer, or a glow discharge optical spectrometer.

15. The system according to claim 7, wherein the analytical device is an X-ray fluorescence spectrometer, a laser induced breakdown spectrometer, or an X-ray diffractometer.

16. The method of according to claim 1, wherein calculating the concentration of the second chemical element includes:
determining a first ratio of the signal intensities to the first chemical element and the second chemical element;
determining a second ratio of the signal sensitivities to the first chemical element and the second chemical element;
multiplying the concentration of the first chemical element by the second ratio to yield a result; and
dividing the result by the first ratio to yield the concentration of the second chemical element.

17. The method of according to claim 1, wherein calculating the concentration of the second chemical element includes:
determining a first ratio of the signal intensities of the first chemical element and the second chemical element;
determining a second ratio of the signal sensitivities to the first chemical element and the second chemical element;
dividing the concentration of the first chemical element by the signal intensity of the first chemical element to yield a result; and
multiplying the result by the signal intensity of the second chemical element and by the second ratio to yield the concentration of the second chemical element.

18. A method for analyzing a sample using a system, wherein the sample is a solid sample comprising a first chemical element and a second chemical element, wherein the system comprises a plasma spectrometer and an analytical device, wherein the plasma spectrometer is configured to ionize the sample using a plasma, such that ions and/or photons are generated, and to analyze the generated ions and/or photons, wherein the analytical device is configured to determine a concentration of the first chemical element, wherein the sample is provided to the plasma spectrometer in the form of an aerosol, the method comprising:
determining a concentration of the first chemical element using the analytical device;
determining a sensitivity of the plasma spectrometer to the first chemical element and a sensitivity of the plasma spectrometer to the second chemical element;
measuring a signal intensity of the first chemical element using the plasma spectrometer;
measuring a signal intensity of the second chemical element using the plasma spectrometer; and
calculating a concentration of the second chemical element based on the determined concentration of the first chemical element, the sensitivities of the plasma spectrometer to the first chemical element and to the second chemical element, and the signal intensities of the first chemical element and the second chemical element,
wherein the analytical device is an X-ray fluorescence spectrometer or an X-ray diffractometer.

* * * * *